(12) United States Patent
Van Leer et al.

(10) Patent No.: US 9,640,086 B2
(45) Date of Patent: May 2, 2017

(54) VOICE COMMUNICATION SYSTEM FOR SIMULATED RADIO NETWORKS

(71) Applicant: The Boeing Company, Chicago, IL (US)

(72) Inventors: Kevin Michael Van Leer, Washington, MO (US); Matthew Jeffrey Brenneke, Lake St. Louis, MO (US); John Ryan Maschmeyer, O'Fallon, MO (US); Suzanne Jeanne Schapperle, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 63 days.

(21) Appl. No.: 14/251,569

(22) Filed: Apr. 12, 2014

(65) Prior Publication Data

US 2015/0295663 A1 Oct. 15, 2015

(51) Int. Cl.
*G09B 9/00* (2006.01)
*H04L 29/06* (2006.01)

(52) U.S. Cl.
CPC .............. *G09B 9/00* (2013.01); *G09B 9/003* (2013.01); *H04L 29/06034* (2013.01)

(58) Field of Classification Search
CPC . G09B 9/00; G09B 9/003; G09B 9/02; G09B 9/26
See application file for complete search history.

(56) References Cited

U.S. PATENT DOCUMENTS

| 4,688,037 A | 8/1987 | Krieg |
| 5,167,020 A | 11/1992 | Kahn et al. |
| 6,965,851 B2 | 11/2005 | Tillotson |
| 6,980,546 B2 | 12/2005 | Purpura et al. |

(Continued)

FOREIGN PATENT DOCUMENTS

| EP | 2693795 A2 | 3/2014 |
| WO | WO03026204 A2 | 3/2003 |
| WO | WO03047169 A1 | 6/2003 |

OTHER PUBLICATIONS

"Welcome to SinnPhonics," SimPhonics, May 7, 2014, 4 pages, http://www.simphonics.com/.

(Continued)

*Primary Examiner* — Devan Sandiford
(74) *Attorney, Agent, or Firm* — Yee & Associates, P.C.

(57) ABSTRACT

A method of radio simulation is provided. The method includes a first computer executing a communication manager, the communication manager configured to provide a radio simulation environment comprising a virtual radio network. The method also includes the first computer executing a communication management controller, wherein the communication management controller receives radio control input for the virtual radio network. The method also includes the first computer executing a tactical and environment cue controller, the tactical and environment cue controller configured to provide simulated audible sounds for the radio simulation environment. The method also includes the first computer executing a configuration controller, the (Continued)

configuration controller coupled to the communication manager and configured to receive at least one radio simulator configuration that designates at least a number of radios and frequencies.

23 Claims, 12 Drawing Sheets

(56) References Cited

U.S. PATENT DOCUMENTS

| | | | |
|---|---|---|---|
| 7,542,436 | B2 | 6/2009 | El-Damhougy |
| 8,095,107 | B2 | 1/2012 | O'Neill et al. |
| 8,135,807 | B2 | 3/2012 | Jackson |
| 8,315,592 | B2 | 11/2012 | O'Neill et al. |
| 8,351,357 | B2 | 1/2013 | El-Damhougy |
| 8,352,223 | B1 | 1/2013 | Anthony et al. |
| 8,462,799 | B2 | 6/2013 | Molsberry et al. |
| 8,565,758 | B2 | 10/2013 | Owyang et al. |
| 8,775,332 | B1* | 7/2014 | Morris .............. G06N 99/005 706/11 |
| 8,843,660 | B1* | 9/2014 | Galibois ............ H04L 41/0813 709/250 |
| 2004/0104933 | A1 | 6/2004 | Friedrich et al. |
| 2006/0183083 | A1* | 8/2006 | Moran .................. F41A 33/00 434/11 |
| 2007/0021954 | A1 | 1/2007 | El-Damhougy |
| 2007/0287133 | A1* | 12/2007 | Schubert ............... F41A 33/00 434/11 |
| 2008/0153529 | A1 | 6/2008 | O'Neill et al. |
| 2009/0313566 | A1* | 12/2009 | Vian .................... G09B 9/003 715/765 |
| 2010/0003652 | A1* | 1/2010 | Lavie .................. G06Q 10/10 434/219 |
| 2010/0074141 | A1* | 3/2010 | Nguyen ............... H04L 41/12 370/254 |
| 2011/0199376 | A1* | 8/2011 | Salemann ............ G06T 17/05 345/424 |
| 2012/0054738 | A1* | 3/2012 | Tseng ..................... G06F 8/61 717/177 |
| 2012/0077465 | A1 | 3/2012 | O'Neill et al. |
| 2012/0088209 | A1* | 4/2012 | Poole .................. G09B 9/003 434/11 |
| 2012/0102097 | A1 | 4/2012 | Jobe et al. |
| 2013/0128012 | A1* | 5/2013 | Turner ................ G06F 3/011 348/53 |
| 2014/0065576 | A1* | 3/2014 | Vogelmann ............ G09B 5/02 434/11 |
| 2014/0170601 | A1* | 6/2014 | Wokurka ............. G09B 9/302 434/35 |
| 2015/0057083 | A1* | 2/2015 | Mehra ................. A63F 13/10 463/35 |
| 2015/0221235 | A1* | 8/2015 | Regan ............... G06F 17/3089 434/118 |
| 2016/0097756 | A1* | 4/2016 | Borkholder ........... G09B 19/00 73/35.15 |

OTHER PUBLICATIONS

"Calytrix Cnr Talk-Record-Connect," Calytrix Technologies, May 7, 2014, 2 pages, hhttp://www2.calytrix.com/products/cnr/introduction/.
Extended European Search Report, dated Sep. 3, 2015, regarding Application No. EP15163380.7, 10 pages.
"Configuration file—Wikipedia, the free encyclopedia," dated Mar. 17, 2014, 4 pages, Accessed Aug. 5, 2015, https://en.wikipedia.org/w/index.php?title=Configuration_file&oldid=599946288.
"Installation (computer programs)—Wikipedia, the free encyclopedia," dated Mar. 22, 2014, 5 pages, Accessed Aug. 5, 2015, https:..en.wikipedia.org/w/index.php?title=Installation_(computer_programs)&oldid=600670351.
Canadian Office Action mailed Apr. 7, 2016, regarding application No. 2882054, 6 pages.
Extended European Search Report, dated Dec. 12, 2016, regarding Application No. EP15163380.7, 8 pages.

* cited by examiner

VOICE COMMUNICATION SYSTEM FOR SIMULATED RADIO NETWORKS

BACKGROUND INFORMATION

1. Field

The present disclosure relates generally to communication systems and, in particular, to a voice communication system providing flexible simulated radio environments for use in warfare and battleground simulations involving multiple participants.

2. Background

Simulated radio networks have traditionally relied on hardware-centric configurations wherein individual users provide their own hardware. Such users also must configure software specific to the hardware. When roles change, users must also reconfigure their software, tasks that may be beyond the capabilities and time limitations of many users. Such prior systems do not provide flexibility to rapidly change configurations regarding users, roles, and permission levels.

Such prior systems require custom hardware and a support and engineering team to build the implementations. In many cases, previous simulated networks would only run on specific software platforms and provided limited user interfaces. Such systems do not provide adequate tools for system-wide configuration, monitoring, and troubleshooting, necessitating ad hoc configurations and increased costs of management.

SUMMARY

The illustrative embodiments provide a method of radio simulation. The method includes a first computer executing a communication manager, the communication manager configured to provide a radio simulation environment comprising a virtual radio network. The method also includes the first computer executing a communication management controller, wherein the communication management controller receives radio control input for the virtual radio network. The method also includes the first computer executing a tactical and environment cue controller, the tactical and environment cue controller configured to provide simulated audible sounds for the radio simulation environment. The method also includes the first computer executing a configuration controller, the configuration controller coupled to the communication manager and configured to receive at least one radio simulator configuration that designates at least a number of radios and frequencies.

The illustrative embodiments also provide for a system. The system includes a processor and a memory connected to the processor, the memory storing program code which, when executed by the processor, performs a computer-implemented method, the program code comprising program code for performing, using the processor, executing a communication manager, the communication manager configured to provide a radio simulation environment comprising a virtual radio network, program code for performing, using the processor, executing a communication management controller, wherein the communication management controller receives radio control input for the virtual radio network, program code for performing, using the processor, executing a tactical and environment cue controller, the tactical and environment cue controller configured to provide simulated audible sounds for the radio simulation environment, and program code for performing, using the processor, executing a configuration controller, the configuration controller coupled to the communication manager and configured to receive at least one radio simulator configuration that designates at least a number of radios and frequencies.

The illustrative embodiments also provide for a method of radio simulation, comprising a first computer creating a configuration file describing a radio simulation, the configuration file designating at least a second computer associated with a participating communicant. The method also comprises the first computer posting the configuration file at a network location and the at least second computer accessing the configuration file from the network location. The method also comprises the at least second computer executing the configuration file and the at least second computer receiving admittance to the radio simulation with at least the first computer based on the configuration file.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
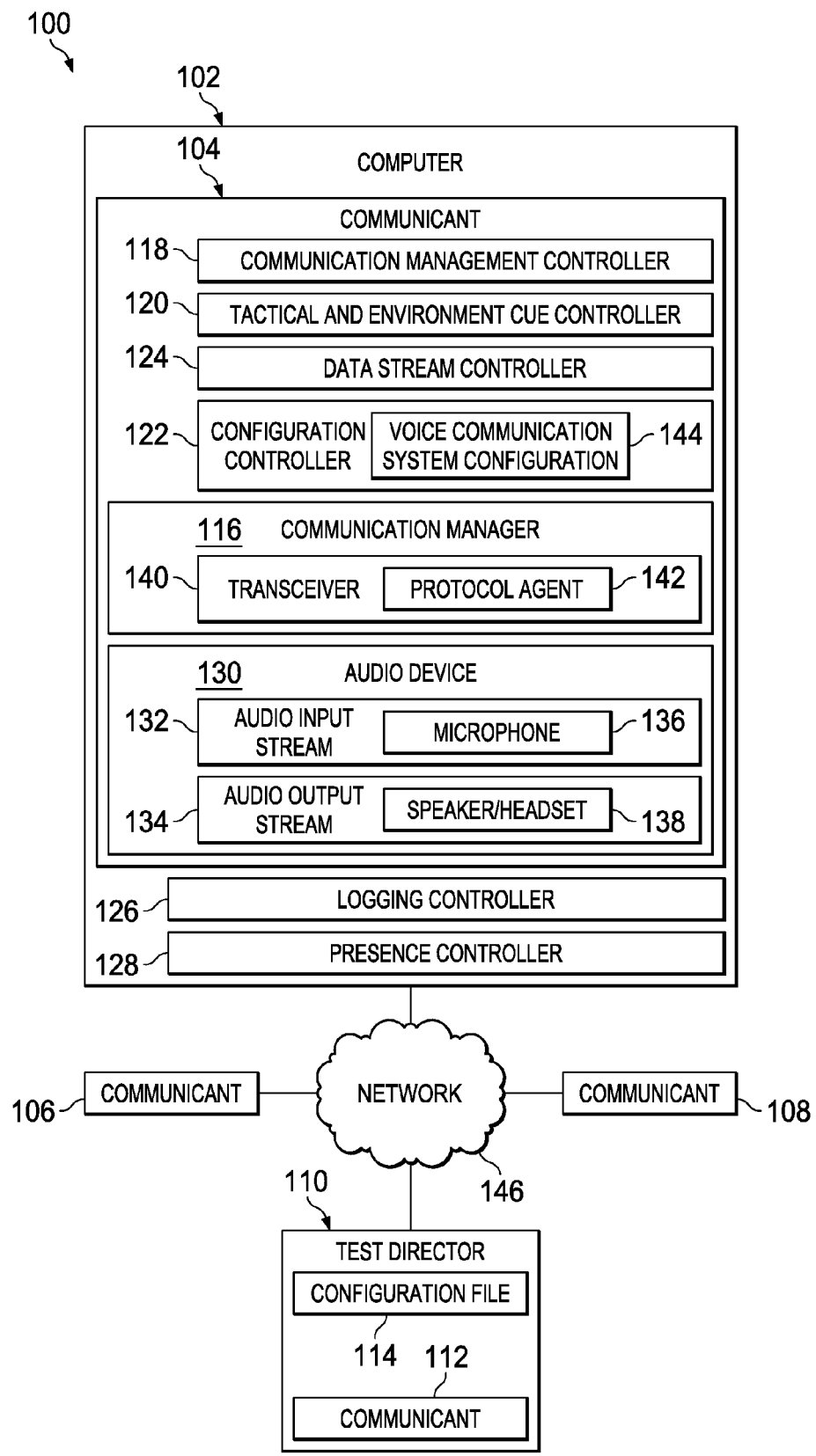
FIG. 1 is a block diagram of a method of a voice communication for simulated radio networks in accordance with an illustrative embodiment.

The illustrative embodiments recognize and account for the limitations and disadvantages of prior radio network simulation systems. The illustrative embodiments therefore provide systems and methods of simulations of radio networks wherein users may take on various roles and receive appropriate access permissions and communications capabilities. Users invited to take part in a simulated radio session may access configuration files from a network location. When executed, the configuration files provide application programming interfaces (API), network protocol interfaces, and audio stream interfaces. The configuration files may be specific to the simulated radio session and may be created by designated users organizing the session.

In an embodiment, an organization or entity seeking to create simulations of aerial and naval warfare and/or battlefield environments may seek to build a voice network that realistically simulates radio communications in such environments. Participants may take on different roles and be provided access to various tools enabling participants to take actions including generating audible warfare sound effects.

Entities such as private defense contractors and military agencies may desire to quickly, such as in a period of several days, change warfare environments to test personnel and equipment in realistic battle scenarios. Personnel participating in radio network simulations may change roles and locations during campaigns and therefore need varying capabilities. The illustrative embodiments allow different radio simulations to be created with configurations distributed wherein participants may join the radio simulations without the need to locate and install specialized hardware and consume time and resources configuring hardware and software.

The illustrative embodiments enable a lead participant to create configuration files for distribution to other participants in a radio simulation. The configuration files may be customized for particular participants based on their roles in the simulation. The configuration files are downloadable by participants executing desktop objects. The downloaded media include control files that when executed adapt to particular participants' hardware and software configurations. At the date and time a particular radio simulation session is to begin, the participant is joined to the radio simulation and may listen, speak, and initiate other actions appropriate to the participant's role in a warfare or other scenario supported by the simulation.

The illustrative embodiments provide a service oriented architecture (SOA) that may use the Distributed Interactive Simulation (DIS) protocol for exchanging simulated radio transmissions. Other communications may use an application programming interface (API) for selection of configuration options such as real time control of frequencies, volume control, and push-to-talk options. The Distributed Interactive Simulation protocol is a standard of the Institute of Electrical and Electronics Engineers (IEEE) that may be used in simulations, such as for example a simulation of conducting real-time platform-level war gaming across multiple host computers. The Distributed Interactive Simulation protocol is defined under Institute of Electrical and Electronics Engineers standard 1278, et seq.

In this protocol, simulation state information is encoded in formatted messages that may be referred to as protocol data units (PDUs). Simulation state information may be exchanged between hosts using existing transport layer protocols, including multicast. The Broadcast User Datagram Protocol may also be supported.

Turning to the figures, FIG. 1 is a block diagram of a voice communication for simulated radio networks in accordance with an illustrative embodiment. FIG. 1 depicts a system 100.

System 100 comprises computer 102. Computers are described in further detail at least in connection with FIG. 10.

As defined herein, the term "participant" is defined as a human user of computer 102. As defined herein, the term "communicant" is defined as a software representation of computer 102 in system 100, and may also include a simulation of or virtual representation of a participant in a radio network simulation, or a combination thereof. Thus, for example, communicant 104 includes at least one application executing on computer 102. Computer 102 hosts communicant 104. Communicant 104 may further include various software components described in detail below.

System 100 also includes communicant 106 and communicant 108 including software similar to software executing on computer 102 and similarly representing other participants in a radio network simulation. While computers that may be similar to computer 102 are not depicted in FIG. 1 for communicant 106 and communicant 108, it is understood that communicant 106 and communicant 108 execute on computers described in detail in FIG. 10.

System 100 also includes test director 110 that is a role that a participant may function in as communicant 112. Test director 110 may initiate a radio network simulation. Communicant 112 functioning in the role of test director 110 may have the permissions or authority to establish new radio simulations. In an embodiment, communicant 112 in the role of test director 110 for a particular radio simulation may in another radio simulation be represented in a different role. For example, in a first radio simulation, communicant 112 may have a role of test director and initiate the first radio simulation. On the following day and for a second radio simulation, communicant 112 may not be in the role of test director and may instead have the same role and privileges as communicant 104, communicant 106, and communicant 108, for example as operator.

Test director 110 is not necessarily a conference leader in the traditional sense that one might associate with a telephone conference call. In an embodiment, a radio network simulation does not have a leader but instead has communicant 104, communicant 106, communicant 108, and communicant 112, each with its own specifically defined role, which at times may include the ability and authority to establish a new radio network simulation as test director 110.

System 100 also includes configuration file 114 that may be created by test director 110 to provide parameters for a new radio network simulation. Configuration file 114 may be created using Extensible Markup Language (XML) or another language or format. Test director 110 creates configuration file 114 and may place configuration file 114 at a network location or otherwise make configuration file 114 generally accessible. Communicant 104, communicant 106, and communicant 108 may regularly access the network location for various purposes. When configuration file 114 indicates that at least one of communicant 104, communicant 106, and communicant 108 is designated to take part in the radio network simulation for which configuration file 114 was created, communicant 104, communicant 106, and communicant 108 may download or otherwise access configuration file 114. In an embodiment, a user or other entity may create configuration file 114 and may not be a participant in any radio network simulation or load any components provided herein.

Configuration file 114 contains files and other electronic media necessary for the at least one of communicant 104, communicant 106, and communicant 108 to join in the radio network simulation initiated by test director 110. When configuration file 114 is executed on computer 102 either manually by participant, via script, or via another manner, files representing various components of communicant 104 may execute on computer 102.

Discussion herein of software and hardware components installed and executing on computer 102 and elsewhere enabling participant using computer 102 to participate as communicant 104 in a simulated radio network also applies to communicant 106, communicant 108, communicant 112, and their respective hardware and software configurations. Communicant 104 includes various software components that when executed on computer 102 enable communicant 104 to be joined to radio network simulation with the role and privileges provided by configuration file 114.

Communicant 104 includes communication manager 116 that is configured to control overall communications of computer 102 in the radio network simulation. Communication manager 116 manages routing and data management between the Distributed Interactive Simulation protocol and hardware and software audio components of computer 102 used to participate in radio network simulation.

Communicant 104 also includes communication management controller 118. Communication management controller 118 receives radio control input including frequencies, operation modes, and commands for "transmit" and "receive." Communication management controller 118 provides controller functions which are interfaced to a voice communication system (VCS) application programming interface (API) for channel selection, volume control, and push-to-talk options. Communication management controller 118 processes messages received from a network or internally from computer 102. Communication management controller 118 may function as a wrapper that exposes interfaces in communication manager 116 to external entities.

Communicant 104 also includes tactical and environment cue controller 120. Tactical and environment cue controller 120 is configured to provide to communication manager 116 simulated sounds for a predetermined simulation actor. Simulated sounds may include engine noises for at least aircraft, ground vehicles, and naval vessels, windscreen noise, radio noise, tank rumble, shop noise, soldier arms noise, and weather, among others.

Communicant 104 also includes configuration controller 122 that provides instructions to communication manager 116 about identities and roles of other communicant 106, communicant 108, and communicant 112 that may be involved in the radio network simulation. Configuration controller 122 receives at least one radio simulator configuration that establishes a number of radios to be simulated during the radio network simulation. In an embodiment, communicant 104 may simulate more than one radio during a radio network simulation.

Communicant 104 also includes data stream controller 124 that provides an output stream, for example through audio functionality provided by computer 102. Data stream controller 124 may provide for speaking and listening capability or listen only capability. Communicant 104 also includes logging controller 126 configured to receive and store radio simulator operational messages and to communicate the messages responsive to a request. Communicant 104 also includes presence controller 128 configured to capture statistics generated regarding the configuration of communicant 104 and performance by communicant during operation. Presence controller 128 also communicates the statistics in response to a request.

Communicant 104 also includes audio device 130 that enables a participant to hear sounds and enter sounds, for example spoken sounds, during a radio network simulation. Audio device 130 provides audio input stream 132 for speech and other input and provides audio output stream 134 for playing of sounds. Audio input stream 132 includes microphone 136. Audio output stream 134 includes speaker/headset 138. Audio device 130 may score and rank such devices as microphone 136 and speaker/headset 138 for automatic selection.

Communicant 104 also includes transceiver 140 that provides virtual antennae, radio transmitters and receivers, data interfaces, and control systems necessary for communicant 104, communicant 106, communicant 108, and communicant 112 to interact with each other. Transceiver 140 may be a component of communication manager 116. Communicant 104 also includes protocol agent 142 which is an interface providing data exchange between communication manager 116 and the Distributed Interaction Simulation (DIS) protocol or other protocols used by communicant 104. Protocol agent 142 allows a participant to select a protocol to be used with a particular instance of transceiver 140 at runtime. Protocol agent 142 may be a component of transceiver 140.

As noted, components corresponding to the components of communicant 104 are not illustrated for communicant 106, communicant 108, and communicant 112, but it is understood that communicant 106, communicant 108, and communicant 112 include such components. It is understood that the components and capabilities of communicant 104 apply to communicant 106, communicant 108, and communicant 112 and that discussion herein about communicant 104 may apply to communicant 106, communicant 108, and communicant 112 unless noted otherwise.

Communicant 104, communicant 106, communicant 108, and communicant 112 interact with each other and with other components using the Distributed Interactive Simulation protocol and the voice communication system (VCS) application programming interface (API), a serialized interface between the components of the voice communication system. Each of communicant 104, communicant 106, communicant 108, and communicant 112 has some combination of voice communication system (VCS) application programming interface (API) interfaces, a network protocol interface, and an audio stream interface. Communicant 104, communicant 106, communicant 108, and communicant 112 tie outward facing interfaces, internal communications models, and data pipelines into cohesive software modules. Voice communication system (VCS) and application programming interface (API) may allow flexible applications to be developed. The API may allow components to interact as part of the same executable files or separate executable files on separate nodes of a network without recompiling or reconfiguration. The API may make such interaction between components possible by registering components as services and publishing information about the services.

Communicant 104 also includes VCS Configuration 144, a mechanism by which communicant 104, communicant 106, communicant 108, and communicant 112 may be instantiated at runtime. VCS Configuration 144 may be a component of configuration controller 122. In an embodiment test director 110 creates and publishes configuration file 114 with the assistance of VCS Configuration 144.

A configuration mechanism of VCS Configuration 144 enables the building of unique configurations on top of generic defaults. The unique configurations, which may be those of communicant 104, communicant 106, communicant 108, and communicant 112, may be associated with multiple users or network nodes, for example computer 102, while still guaranteeing uniquely identifiable entries. The capabilities of VCS Configuration 144 may make configuration of large distributed radio network simulations easier and less prone to errors than other implementations. All of communicant 104, communicant 106, communicant 108, and communicant 112 may be represented in a single file that may be configuration file 114 and each data value may need to be expressed a single time.

System 100 also includes network 146 that may be a data network extending across a single building, a campus, or a larger area. Network 146 may be a local area network or a wide area network. Network 146 hosts radio network simulations provided herein.

Figure 2:
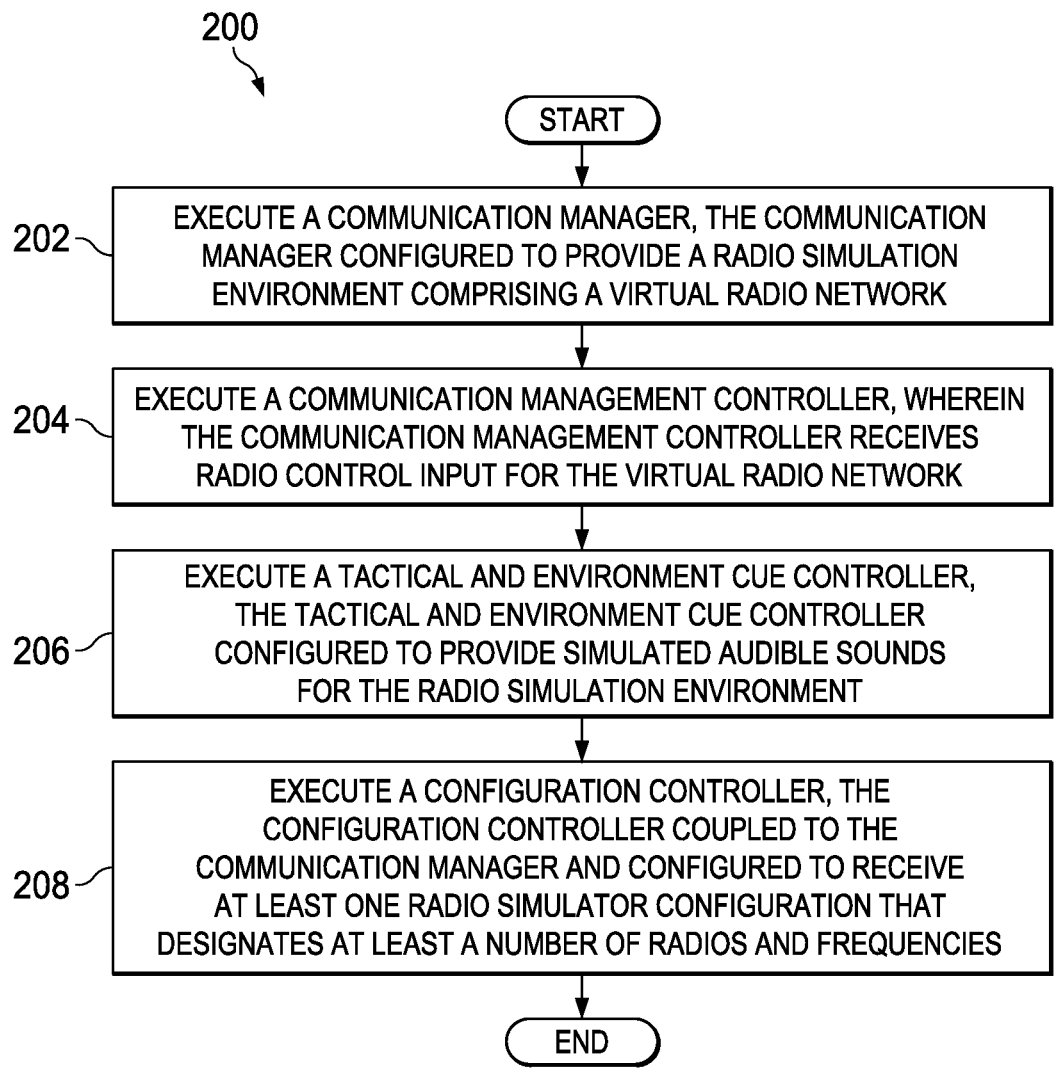
FIG. 2 is a flowchart of a method of radio network simulation in accordance with an illustrative embodiment.

FIG. 2 is a flowchart of a method of radio network simulation in accordance with an illustrative embodiment. Method 200 shown in FIG. 2 may be implemented using system 100 of FIG. 1. The process shown in FIG. 2 may be implemented by a processor, such as processor unit 1304 of FIG. 13. The process shown in FIG. 2 may be a variation of the techniques described in FIG. 1 and FIG. 3 through FIG. 13. Although some of the operations presented in FIG. 2 are described as being performed by a "process," the operations are being performed by at least one tangible processor or using one or more physical devices, as described elsewhere herein. The term "process" also may include computer instructions stored on a non-transitory computer readable storage medium.

Method 200 may begin as the process may execute a communication manager, the communication manager configured to provide a radio simulation environment comprising a virtual radio network (operation 202). Next, the process may execute a communication management controller, wherein the communication management controller receives radio control input for the virtual radio network (operation 204). Next, the process may execute a tactical and environment cue controller, the tactical and environment cue controller configured to provide simulated audible sounds for the radio simulation environment (operation 206). Next, the process may execute a configuration controller, the configuration controller coupled to the communication manager and configured to receive at least one radio simulator configuration that designates at least a number of radios and frequencies (operation 208).

First computer may activate at least one data stream controller for at least one of audible input and output. First computer may be computer 102 provided by system 100. Data stream controller may be data stream controller 124 provided by system 100. First computer may activate at least one logging controller configured to receive and store operational messages associated with the radio simulation environment and configured to communicate the operational messages in response to a request. Logging controller may be logging controller 126 provided by system 100. Operational messages may include instructions from a mission control function to a pilot or operator function.

First computer may activate at least one presence controller configured to capture and communicate system configuration and performance statistics associated with the radio simulation environment. Presence controller may be presence controller 128 provided by system 100. First computer may host a first communicant taking part in the radio simulation with at least a second communicant. First communicant may be communicant 104 provided by system 100. Second communicant may one of communicant 106, communicant 108, communicant 112 provided by system 100.

First computer may use at least the Distributed Interactive Simulation (DIS) protocol in the radio simulation environment. Radio control input for first computer may include at least one of frequencies, operation modes and transmit and receive commands for the virtual radio network.

At least one of communication manager, communication management controller, configuration controller, and tactical and environment cue controller may be provided to first computer in a configuration file created by a second computer. Communication manager may be communication manager 116 provided by system 100. Communication management controller may be communication management controller 118 provided by system 100. Configuration controller may be configuration controller 122 provided by system 100. Tactical and environment cue controller may be tactical and environment cue controller 120 provided by system 100. Configuration file may be configuration file 114 provided by system 100. Second computer may host at least one of communicant 106, communicant 108, communicant 112 provided by system 100

Figure 3:
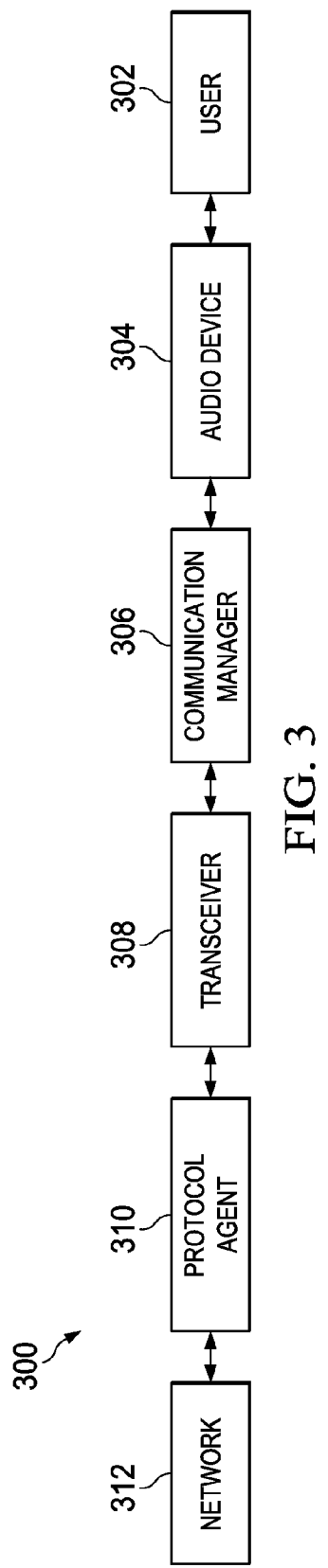
FIG. 3 is a flow diagram of an audio pipeline of a simulated radio network in accordance with an advantageous embodiment.

FIG. 3 is a flow diagram of an audio pipeline of a simulated radio network in accordance with an advantageous embodiment. FIG. 3 provides flow diagram 300 of message transmission using some components of system 100. Some components of flow diagram 300 correspond and are indexed to components of system 100. User 302 corresponds to a participant. Audio device 304 corresponds to speaker/headset 138 and microphone 136 of system 100 of FIG. 1. Communication manager 306 corresponds to communication manager 116 of system 100. Transceiver 308 corresponds to transceiver 140 of system 100. Protocol Agent 310 corresponds to Protocol Agent 142 of system 100. Network 312 corresponds to network 146 that carries messaging associated with a radio network simulation as described in association with system 100. The audio pipeline is the mechanism for moving audio data from a network protocol interface of network 146 to a physical audio interface, such as speaker/headset 138 of system 100 of FIG. 1.

Figure 4:
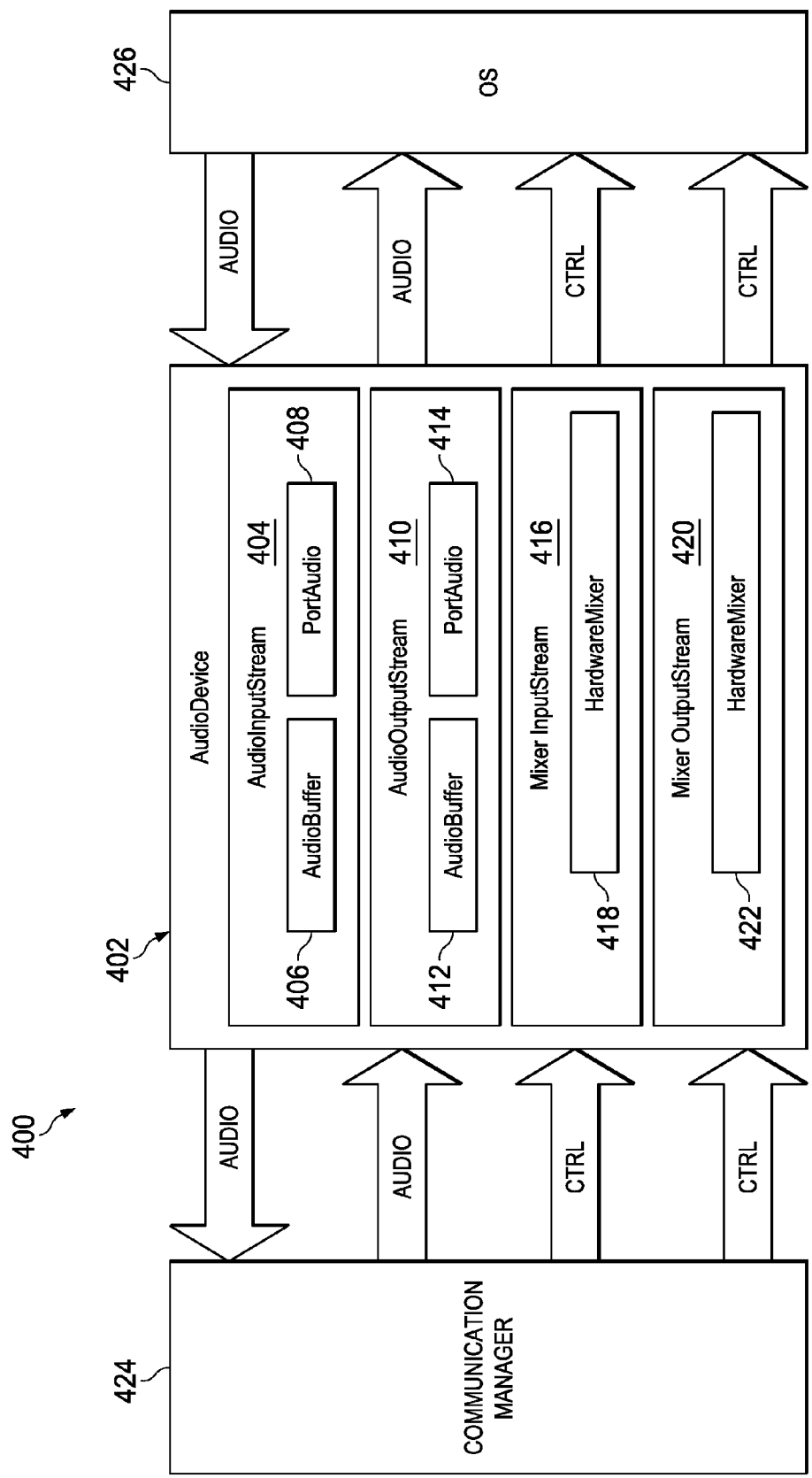
FIG. 4 is a block diagram of an audio device of a simulated radio network in accordance with an advantageous embodiment.

FIG. 4 is a block diagram of an audio device of a simulated radio network in accordance with an advantageous embodiment. FIG. 4 depicts a system 400 of AudioDevice. AudioDevice 402 of system 400 may correspond to Audio Device 130 of system 100. AudioDevice 402 may be a component in an audio pipeline, for example the audio pipeline depicted in FIG. 3.

AudioDevice 402 may be a wrapper around four components of a practical audio interface. AudioDevice 402 includes AudioInputStream 404 which includes AudioBuffer 406 and PortAudio 408. In an embodiment, PortAudio 408 may be a commercially available product. AudioDevice 402 also includes AudioOutputStream 410 which includes AudioBuffer 412 and PortAudio 414. AudioDevice 402 also includes Mixer InputStream 416 which includes HardwareMixer 418. AudioDevice 402 also includes Mixer OutputStream 420 which includes HardwareMixer 422. System 400 also includes communication manager 424 which corresponds to communication manager 116 of system 100. System 400 also includes OS 426 which is operating system software executing on at least one of computer 102 of system 100 and computers executing at least one of communicant 104, communicant 106, communicant 108, and communicant 112 of system 100.

AudioDevice 402 queries OS 426 and uses rules to determine which devices, for example speaker/headset 138 and microphone 136 of system 100, may belong together. The rules are also used to rank each device. The ranking is used to prioritize the devices, making it possible to automatically select the best device at runtime and may eliminate a need to manually select or configure devices. Device levels may be monitored and adjusted to ensure the device levels are appropriate for audio capture and playback. Arrows depicted in FIG. 4 as "audio" and "ctrl" between communication manager 424 and AudioDevice 402 and between AudioDevice 402 and OS 426 indicate the movement of audio content and control signals, respectively, between communication manager 424, AudioDevice 402, and OS 426.

Figure 5:
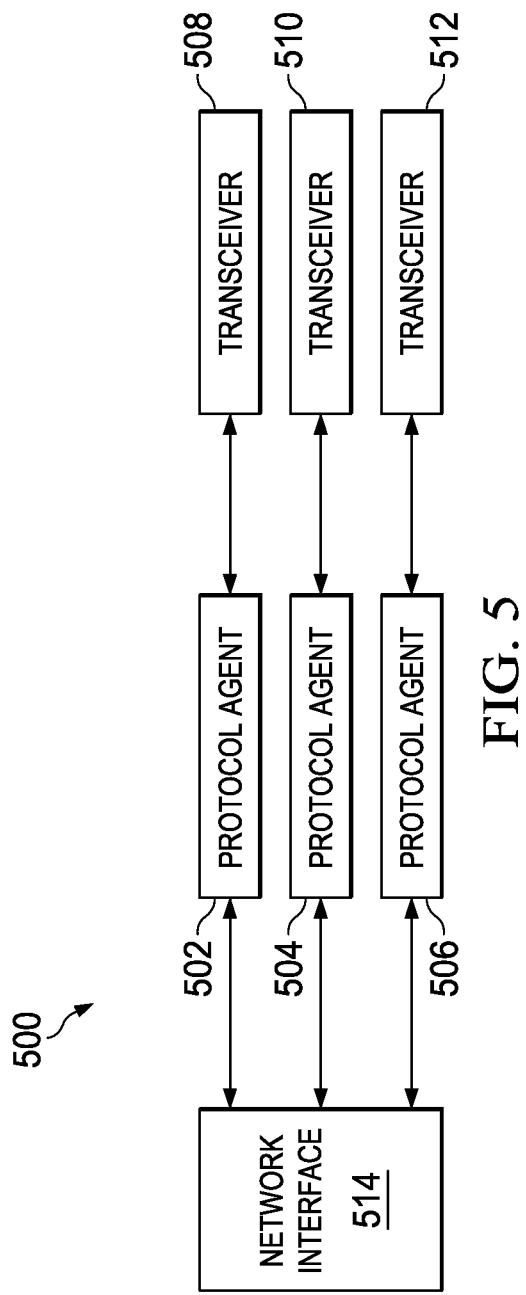
FIG. 5 is a block diagram of a protocol interface of a simulated radio network in accordance with an advantageous embodiment.

FIG. 5 is a block diagram of a protocol interface of a simulated radio network in accordance with an advantageous embodiment. FIG. 5 depicts system 500 of a protocol interface. System 500 includes protocol agent 502, protocol agent 504, and protocol agent 506 that correspond to protocol agent 142 of system 100. System 500 also includes transceiver 508, transceiver 510, and transceiver 512 that correspond to transceiver 140 of system 100. System 500 also includes network interface 514 that may be hardware and software installed in or otherwise associated with computer 102 as well as computers hosting communicant 106, communicant 108, and communicant 112 that enable these devices to transmit and receive on network 146 of FIG. 1.

Protocol interface provided by system 500 translates audio from transceiver 508, transceiver 510, and transceiver 512 to the desired protocol that may be Distributed Interactive Simulation (DIS) and manages the rules for formatting, timing issuing that protocol. Interfaces between protocol agent 502, protocol agent 504, and protocol agent 506 and transceiver 508, transceiver 510, and transceiver 512 may be generic such that data being transmitted may be translated to many protocols.

Figure 6:
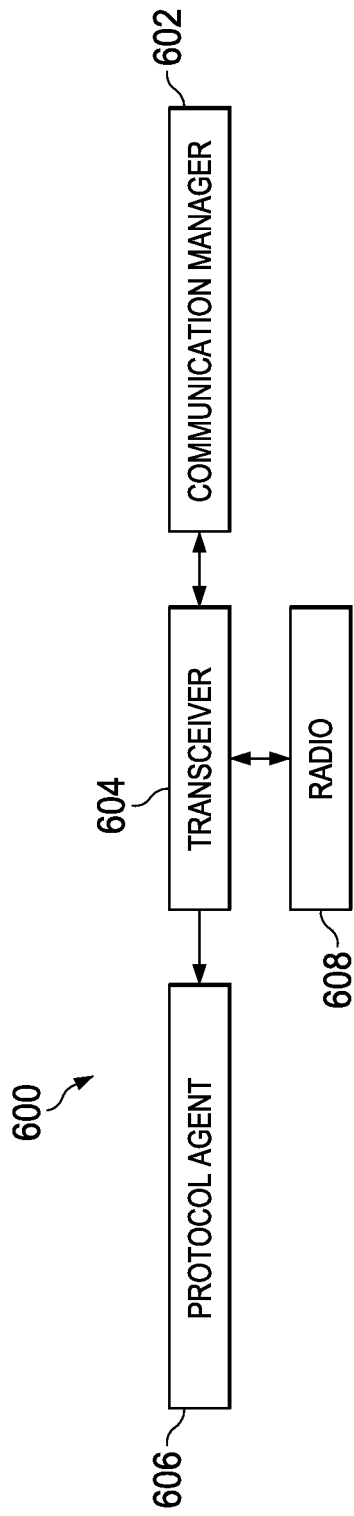
FIG. 6 is a block diagram of a transceiver function of a simulated radio network in accordance with an advantageous embodiment.

FIG. 6 is a block diagram of a transceiver function of a simulated radio network in accordance with an advantageous embodiment. FIG. 6 depicts system 600 of a transceiver function. System 600 includes communication manager 602 that corresponds to communication manager 116 of system 100. System 600 includes transceiver 604 that corresponds to transceiver 140 of system 100. System 600 includes protocol agent 606 that corresponds to protocol agent 142 of system 100. System 600 also includes radio 608.

Transceiver 604 may function as a gate that controls data flow between protocol agent 606 and communication manager 602 that may function as a mixer. Transceiver 604 considers both input from a participant and a protocol in use to determine if data can pass through transceiver 604 in either direction. In FIG. 6, transceiver 604 is connected to radio 608. Radio 608 may use rules for a given type of radio transmission to determine if a transmission can be received. Given types of radios may include AM (amplitude modulation), FM (frequency modulation), SATCOM (satellite communication), and Intercom. Radio 608 considers qualities of the components of system 600 as well as propagation losses that may impede reception.

Figure 7:
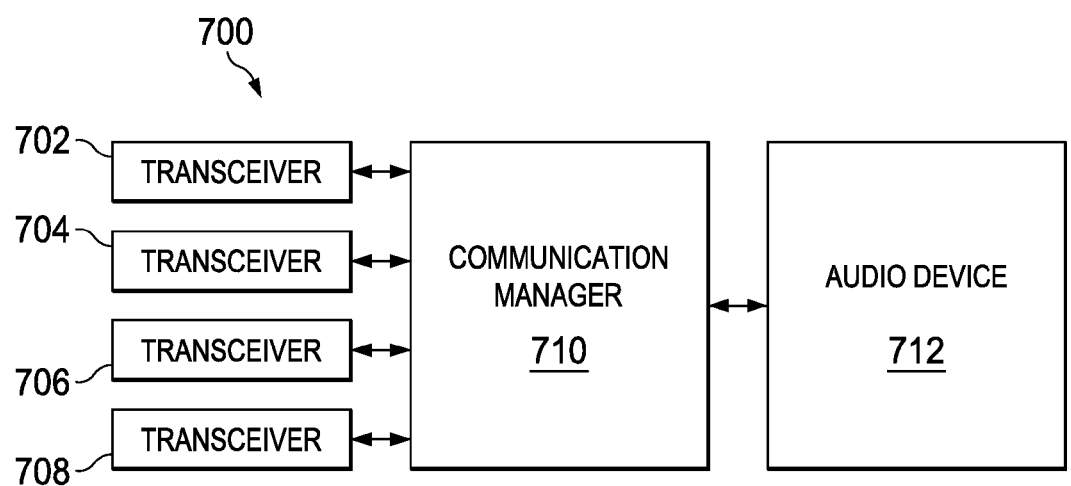
FIG. 7 is a block diagram of a communication manager function of a simulated radio network in accordance with an advantageous embodiment.

FIG. 7 is a block diagram of a communication manager function of a simulated radio network in accordance with an advantageous embodiment. FIG. 7 depicts a system 700 of a communication manager. System 700 includes transceiver 702, transceiver 704, transceiver 706, and transceiver 708 that correspond to transceiver 140 of system 100, transceiver 604 of system 600, and transceiver 508, transceiver 510, and transceiver 512 of system 500. System 700 also includes communication manager 710 that corresponds to communication manager 116 of system 100 and communication manager 602 of system 600. System 700 also includes audio device 712 that corresponds to speaker/headset 138 and microphone 136 of system 100.

Communication manager 710 may mix audio received from the Distributed Interface Simulation (DIS) protocol or other protocol and may multiplex audio received from audio device 712. FIG. 7 illustrates a point in system 700 where transmission and reception of data come together. FIG. 7 also illustrates a point in system 700 at which a participant interacts with the audio streams and selects to which of at least one of transceiver 702, transceiver 704, transceiver 706, and transceiver 708 that audio will be routed.

Figure 8:
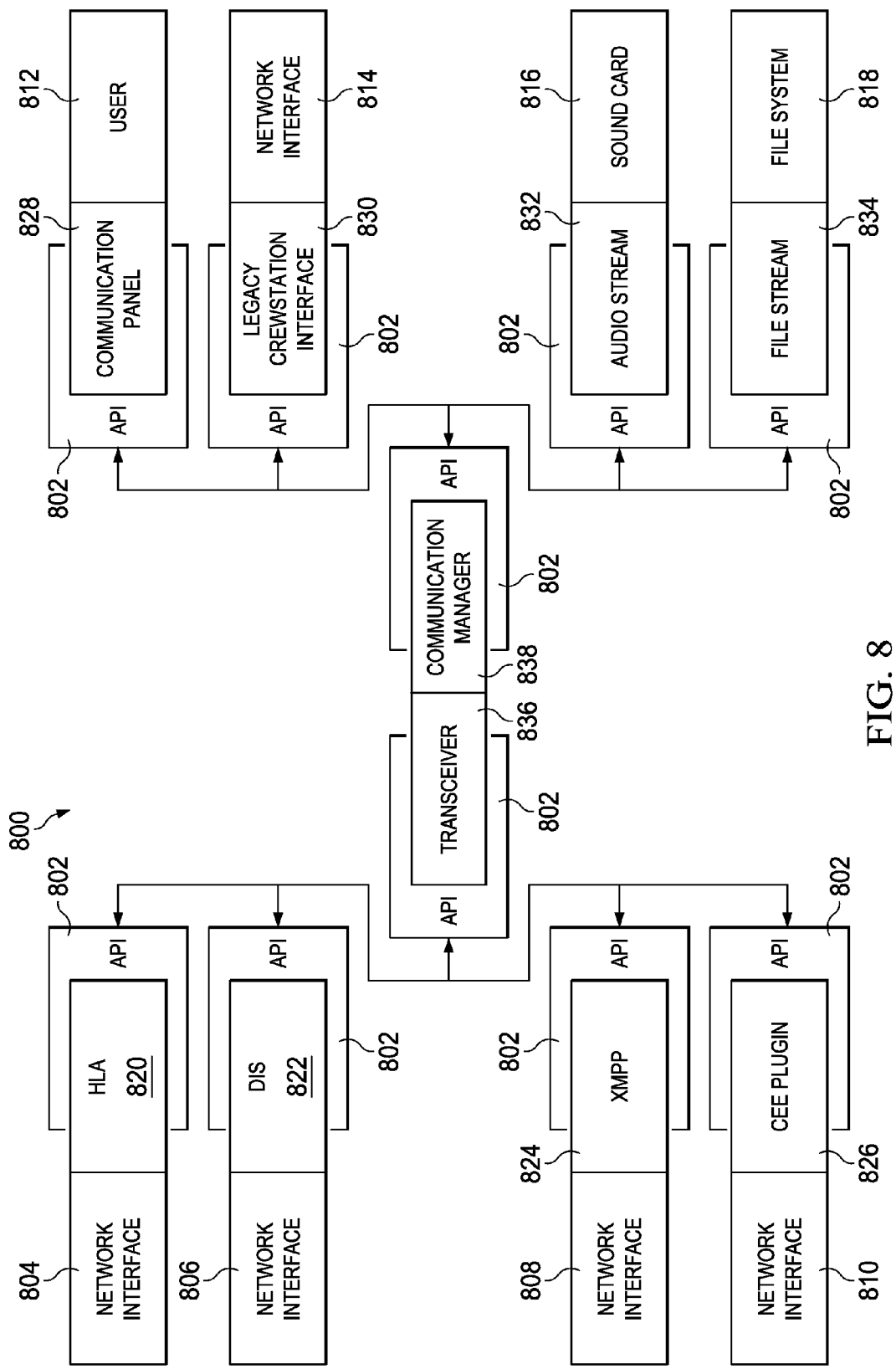
FIG. 8 is a block diagram of a system of a simulated radio network in accordance with an advantageous embodiment.

FIG. 8 is a block diagram of a system of a simulated radio network in accordance with an advantageous embodiment. FIG. 8 illustrates a system 800. Interactions of components provided by system 800 and depicted in FIG. 8 are directly related to interactions of components depicted in FIG. 3 through FIG. 7. While a component corresponding to application programming interface 802 may not be depicted in each of FIG. 3 through FIG. 7, such an application programming interface is present and active in each depicted configuration in transmitting messages associated with remote procedure calls associated with combinations of protocols and network interfaces to transceiver 836 and communication manager 838 that enable admittance to radio network simulations. Remote procedure calls may be consumers of services and component controllers such as transceiver 836 may be service providers.

FIG. 8 illustrates how numerous protocols, plug-in components, and software elements combine with network interfaces, users and devices to interact with transceiver 836 and communication manager 838 and thereby enable radio simulations. Transceiver 836 provided by system 800 corresponds to transceiver 140 provided by system 100. Communication manager 838 provided by system 800 corresponds to communication manager 116 provided by system 100. System 800 includes application programming interface 802 being deployed in a variety of combinations of network and other interfaces and with various protocols.

FIG. 8 illustrates how application programming interface 802 provides abstraction such that numerous protocols, plug-in components, and software elements combined with network interfaces, users and devices to receive access to radio simulations provided by transceiver 836 and communication manager 838. Application programming interface 802 abstracts out hardware and software details associated with remote procedure calls (RPC) generated by participants such that transceiver 836 and communication manager 838 provide access regardless of the interface that the participant may use to join a radio simulation. Application programming interface 802 receives and processes the remote procedure calls (RPC) such that transceiver 836 and communication manager 838 may provide the at least one of communicant 104, communicant 106, communicant 108, and communicant 112 requested access.

System 800 includes devices or entities that interact externally including network interface 804, network interface 806, network interface 808, and network interface 810 as well as user 812 that may be a participant, network interface 814, sound card 816, and file system 818. Application programming interface 802 allows objects depicted along the right side of FIG. 8 and along the left side of FIG. 8 to interface with transceiver 836 and communication manager 838.

In system 800, application programming interface 802 enables components such as HLA 820 and DIS 822 to interface with the devices or entities that interact externally. The acronym HLA stands for "high level architecture." Application programming interface 802 enables HLA 820 to interface with transceiver 836. HLA 820 is a simulation protocol that may be used in combination or interchangeably with the Distributed Interactive Simulation protocol. FIG. 8 may illustrate how application programming interface 802 enables transceiver 836 to publish data in a variety of protocols, for example HLA 820 and DIS 822.

Application programming interface 802 enables DIS 822 or Distributed Interactive Simulation to interface with transceiver 836. DIS 822 and Distributed Interactive Simulation are analogous terms. DIS 822 as provided by system 800 is an implementation of the Distributed Interactive Simulation protocol. Application programming interface 802 overcomes incompatibilities between HLA 820 and DIS 822 and may enable a more complete transceiver 836 to provide information to protocols such that the protocols may be able to communicate information about transceiver 836 on radio simulation network.

Continuing discussion of FIG. 8 and system 800 and proceeding further down the left side of FIG. 8, application programming interface 802 enables XMPP 824 to interface with network interface 808. Like DIS 822, XMPP 824 is another example of one of the protocols that interface with the devices or entities that interact externally, as described above. The acronym XMPP stands for "Extensible Messaging and Presence Protocol" and is a peer protocol that interacts with various network interfaces, for example network interface 808.

Continuing with combinations of protocols or other software components that interface with externally-accessing devices, application programming interface 802 enables CEE Plugin 826 to interface with network interface 810. CEE Plugin 826 is a communication effects engine plugin that simulates radio propagation effects and line of sight effects used in radio simulations. CEE Plugin 826 may also interface with a communications effects engine server (not shown) which provides information about specific transceivers and whether the specific transceivers should be receiving transmissions at any given time.

Referring to the right side of FIG. 8 and continuing the discussion of component and interface interactions provided by system 800, application programming interface 802 enables communication panel 828 to interface with user 812 in providing access to communication manager 838 and transceiver 836. User 812 may be a participant as described herein. Immediately following below, FIG. 8 further depicts application programming interface 802 enabling legacy crewstation interface 830 to combine with communication panel 828 and provide communicant 104 cockpit simulation access to communication manager 838 and transceiver 836. Legacy crewstation interface 830 is a wrapper that receives legacy messages generated using older protocols and converts the legacy messages that may use application programming interface 802.

Continuing down the right side of FIG. 8, application programming interface 802 enables audio stream 832 to interface with sound card 816. Application programming interface 802 enables file stream 834 to interface with file system 818.

Turning now to the center of FIG. 8, transceiver 836 is depicted interfacing with communication manager 838. Transceiver 836, in addition to corresponding to transceiver 140 of system 100, also corresponds to transceiver 604 of system 600, and transceiver 508, transceiver 510, and transceiver 512 of system 500. Communication manager 838 also corresponds to communication manager 602 of system 600.

In the center of FIG. 8, transceiver 836 and communication manager 838 interface together and are in turn interfaced by application programming interface 802 with the combinations of protocols, plug-in components, and software elements with network interfaces, users and devices described above. In an embodiment, other combinations of protocols or standards with externally interacting devices or entities may be supportable.

In summary, application programming interface 802 ties components of system 800 together while allowing the components to remain autonomous. Different components may share the same interface. For example, audio stream 832 and file stream 834 share the same interface to communication manager 838. Either audio stream 832, file stream 834, or both may be instantiated and send or receive data from communication manager 838.

As noted in the discussion of FIG. 8 and system 800, combinations of protocols, plug-in components, and software elements with network interfaces, users and devices represent instances of communicant 104 seeking to access a radio network simulation. While FIG. 8 may provide eight such examples, in embodiments other such combinations may be possible. Activity by communicant 104 in accessing and participating in radio network simulation results in remote procedure calls (RPC) being generated. Application programming interface processes the remote procedure calls (RPC) such that communication manager 116, transceiver 140, and other components may understand and correctly process requests by communicant 104 at the inception of and during participation by communicant 104 in radio network simulation.

Thus, in summary, FIG. 8 presents a conceptual presentation illustrating flexibility of application programming interface 802 in accommodating various interfaces. The four combinations of components shown on the left side of FIG. 8 and the four combinations of components shown on the right side of FIG. 8 represent examples of how participants represented by at least one of communicant 104, communicant 106, communicant 108, and communicant 112 may use various interfaces to gain access to a radio simulation by generating remote procedure calls (RPC).

Figure 9:
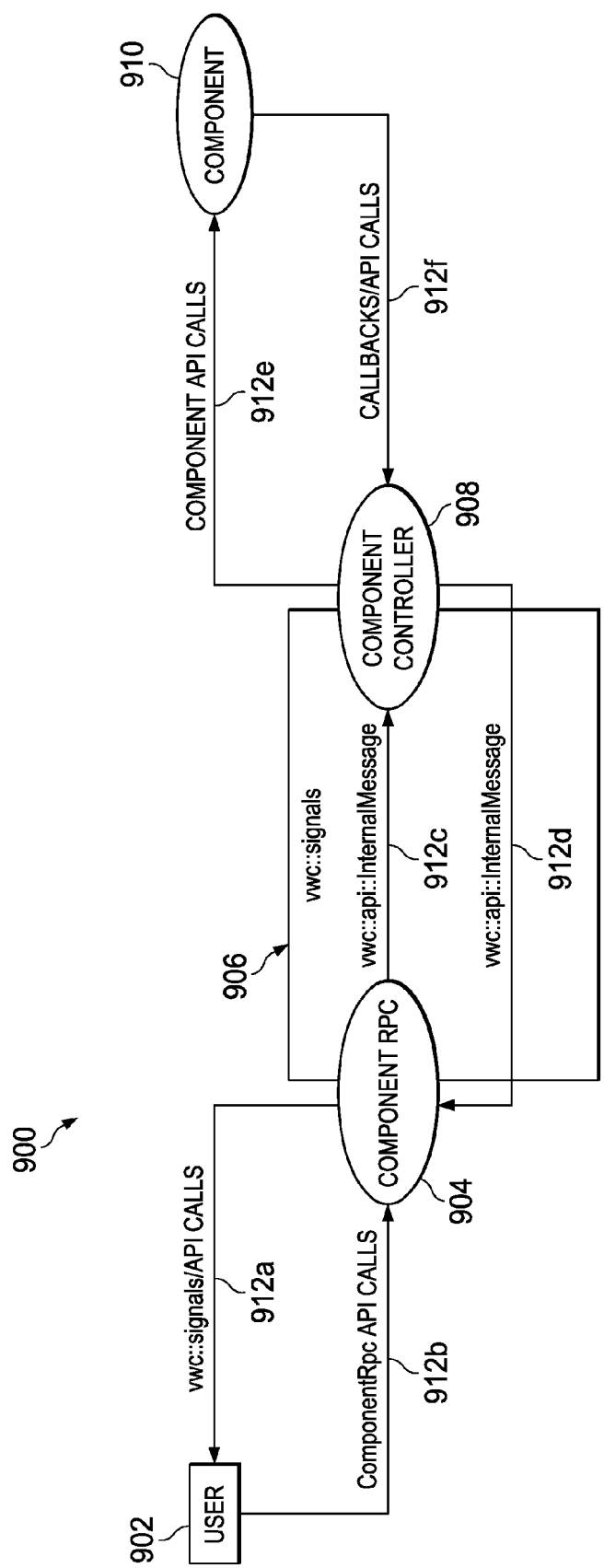
FIG. 9 is a flow diagram of a system of a simulated radio network in accordance with an advantageous embodiment.
Figure 10:
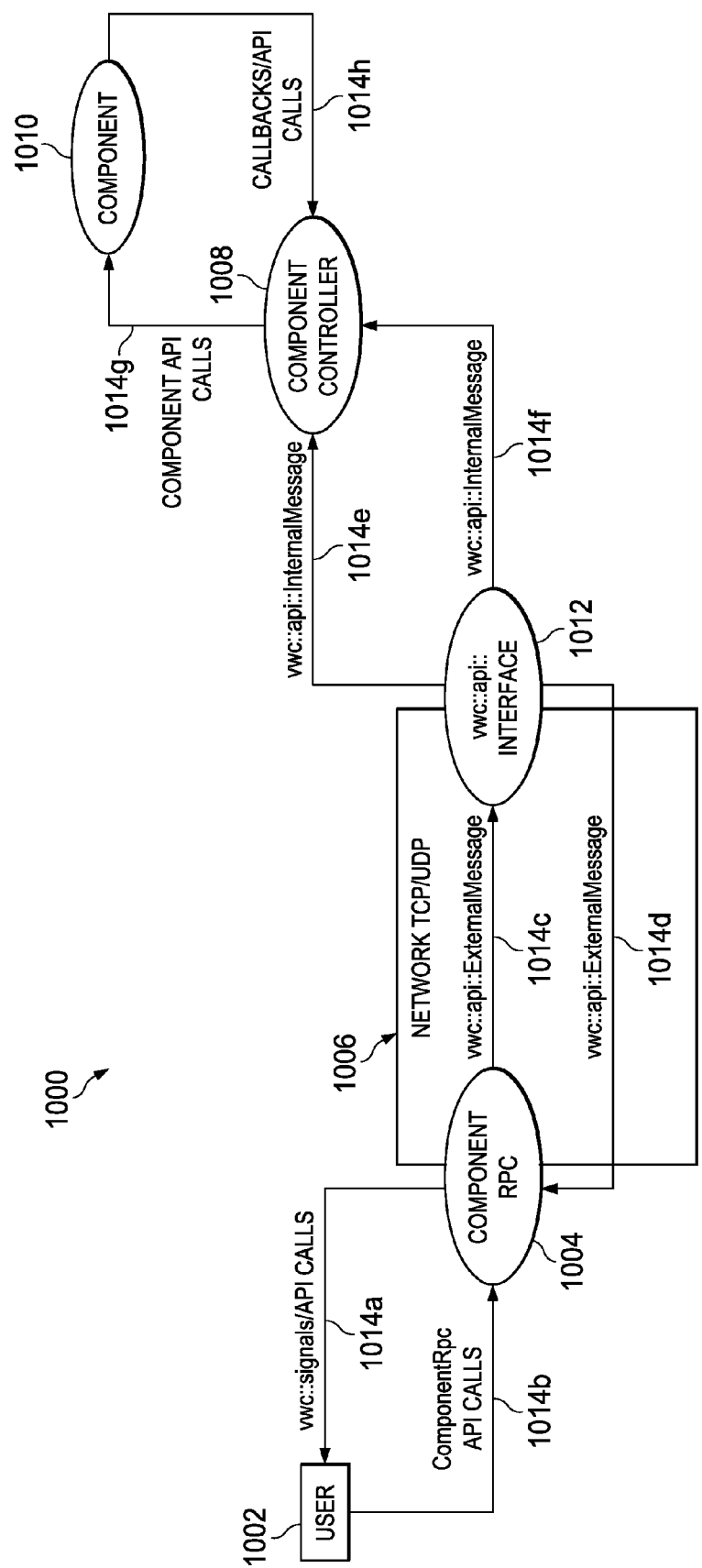
FIG. 10 is a flow diagram of a system of a simulated radio network in accordance with an advantageous embodiment.
Figure 11:
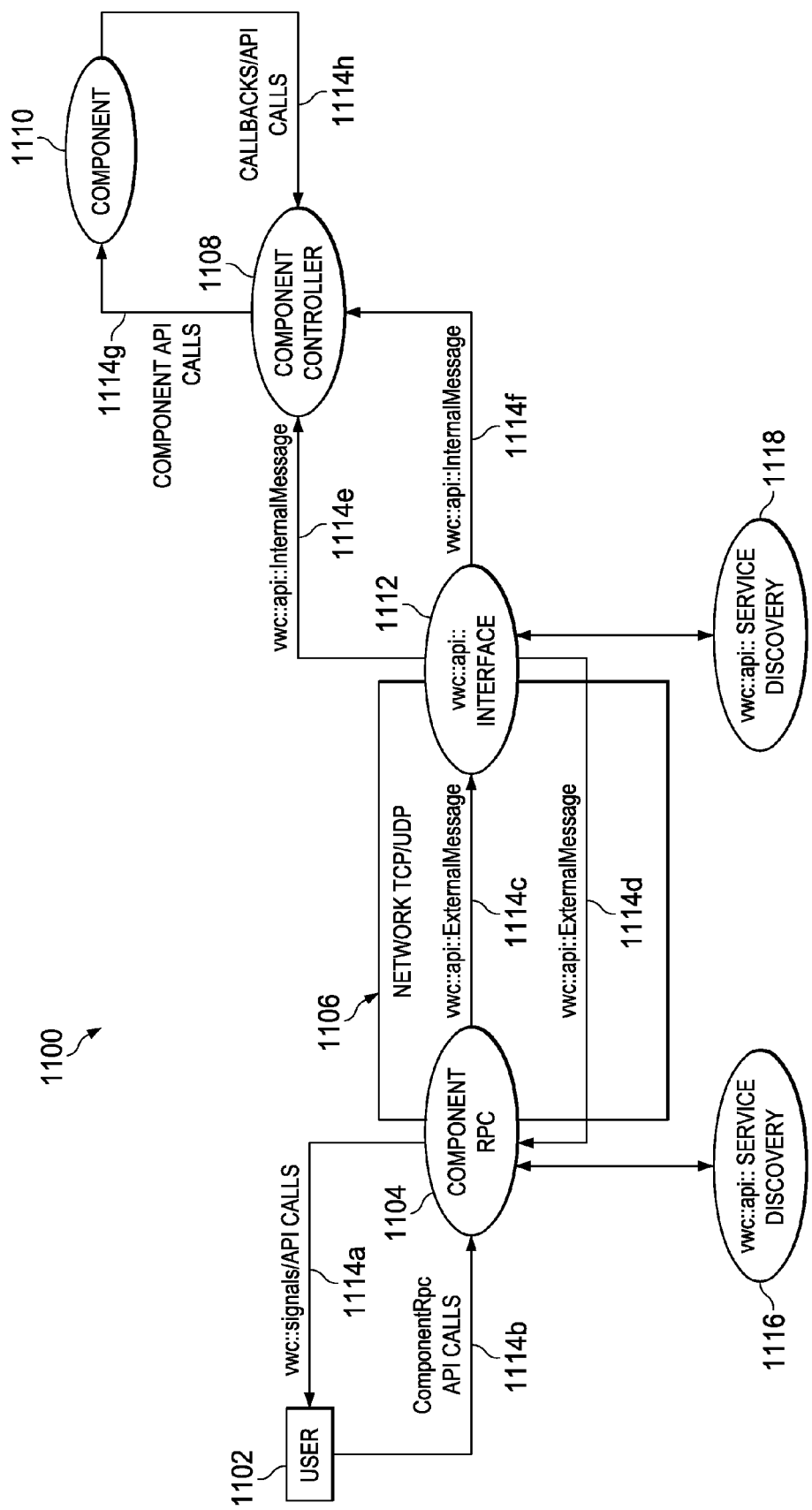
FIG. 11 is a flow diagram of a system of a simulated radio network in accordance with an advantageous embodiment.

FIG. 9, FIG. 10, and FIG. 11 illustrate further interactions of application programming interface in connecting remote procedure calls, such as those described with respect to FIG. 8 in the prior paragraph, and associated with action of communicant 104 directed to communication manager 116 and transceiver 140 of system 100 resulting in enabling communicant 104 to join and participate in radio network simulation, as described in FIG. 1. FIG. 9, FIG. 10, and FIG. 11 each depicts a manner in which application programming interface 802 provided by system 800 may connect remote procedure calls (RPC) with communication manager 116, transceiver 140, and other components.

FIG. 9 is a flow diagram of a system of a simulated radio network in accordance with an advantageous embodiment. FIG. 9 depicts system 900 of a voice communication system application programming interface/remote procedure call design for intraprocess communication. Application programming interface 802 provided by system 800 of FIG. 8 facilitates the receipt of requests represented by remote procedure calls and the satisfaction of the requests by components provided by system 900 of FIG. 9.

System 900 includes user 902 that may be a participant as previously described. System 900 also includes component RPC 904 wherein RPC is remote procedure call generated by action of user. System 900 also includes interface 906 which is the mechanism used to transmit messaging between remote procedure calls and communication manager 116 of system 100. System 900 also includes component controller 908 that corresponds to communication manager 116. System 900 also includes component 910 that may correspond to audio device 130 of system 100.

In system 900, interface 906 uses the signals and slots language construct for communications. When a front end and a back end of an interface, for example interface 906 are part of the same process or application, communications may be handled through a signals and slots pattern, for example the pattern provided by interface 906. The relationship may be characterized as one to many, wherein one controller, for example, component controller 908, communicates with many of component RPC 904. System 900 also includes numerous function calls between components, including function call 912*a*, function call 912*b*, function call 912*c*, function call 912*d*, function call 912*e*, and function call 912*f*. Function call 912*a*, function call 912*b*, function call 912*c*, function call 912*d*, function call 912*e*, and function call 912*f*.

The six function calls shown are not shown in specific detail, as the function calls themselves are not important to the illustrative embodiments; rather, the six function calls are shown to illustrate that numerous function calls may be handled by system 900. However, generally speaking, function calls transmit requests and associated parameters generated by application programming interface 802 of FIG. 8 that arise from remote procedure calls made by communicant 104. Function calls also receive callback transmissions provided by component 1010 and component controller 1008 of FIG. 10 in response to remote procedure calls. In any case, these function calls are converted into messages that may be in turn converted into signals or network packets and transmitted and thereafter decoded by a receiving station or entity.

FIG. 10 is a flow diagram of a system of a simulated radio network in accordance with an advantageous embodiment. FIG. 10 depicts system 1000 of a voice communication system application programming interface/remote procedure call design for interprocess communication, as opposed to the intraprocess arrangement of FIG. 9. System 1000 provides some components that correspond to components of system 900. System 1000 includes user 1002 that corresponds to user 902 of system 900. System 1000 includes component RPC 1004 that corresponds to component RPC 904 provided by system 900. System 1000 includes interface 1006 that corresponds to interface 906 provided by system 900. System 1000 includes component controller 1008 that corresponds to component controller 908 provided by system 900. System 1000 includes component 1010 that corresponds to component 910 provided by system 900. System 1000 also includes vwc::api::Interface 1012 that functions between interface 1006 and component controller 1008. System 1000 also includes function calls between components, including function call 1014*a*, function call 1014*b*, function call 1014*c*, function call 1014*d*, function call 1014*e*, function call 1014*f*, function call 1014*g*, and function call 1014*h*. Again, as described above, the exact nature of the function calls is not important to the illustrative embodiments, only the fact that the illustrative embodiments handle numerous function calls.

Interface 1006 includes a network layer for multiple processes. Messages are forwarded to a second process. Interface 1006 is depicted as Network TCP/UDP, wherein the acronym TCP stands for Transmission Control Protocol and the acronym UDP stands for User Datagram Protocol. Two parts of the application programming interface are separated between two processes. When a front end and a back end are split between two processes, signals may be passed through a networking module, for example vwc::api::Interface 1012, that serializes messages and passes messages between processes.

FIG. 11 is a flow diagram of a system of a simulated radio network in accordance with an advantageous embodiment. System 1100 is a voice communication system application programming interface/remote procedure call design for interprocess communication with service interface. System 1100 provides some components that correspond to components of system 900 of FIG. 9. System 1100 includes user 1102 that corresponds to user 1002 of system 1000 of FIG. 10. System 1100 includes component RPC 1104 that corresponds to component RPC 1004 of system 1000 of FIG. 10.

System 1100 includes interface 1106 that corresponds to interface 1006 provided by system 1000. System 1100 includes component controller 1108 that corresponds to component controller 1008 provided by system 1000. System 1100 includes component 1110 that corresponds to component 1010 provided by system 1000. System 1100 also includes vwc::api::Interface 1112 that functions between interface 1106 and component controller 1108. System 1100 also includes numerous function calls between components, including function call 1114*a*, function call 1114*b*, function call 1114*c*, function call 1114*d*, function call 1114*e*, function call 1114*f*, function call 1114*g*, and function call 1114*h*. Similar to FIG. 10 and system 1000, function calls provided by FIG. 11 and system 1100 transmit requests and associated parameters generated by application programming interface 802 that arise from remote procedure calls made by communicant 104. Function calls also receive callback transmissions provided by component 1110 and component controller 1108 in response to remote procedure calls.

System 1100 also includes vwc::api::Service Discovery 1116 that communicates with component Rpc 1104. System 1100 also includes vwc::api::Service Discovery 1118 that communicates with vwc::api::Interface 1112. In an embodiment, more than one of component controller 1108 may be present. Each of component controllers 1108 may be registered as at least one service using a service interface. Applications may then couple remote procedure calls and controllers based on attributes of the controllers rather than relying on network addresses. Remote procedure calls need not have knowledge about the existence of any particular component controller 1108. Remote procedure calls may instead discover component controller 1108 at runtime and connect on an ad hoc basis.

Figure 12:
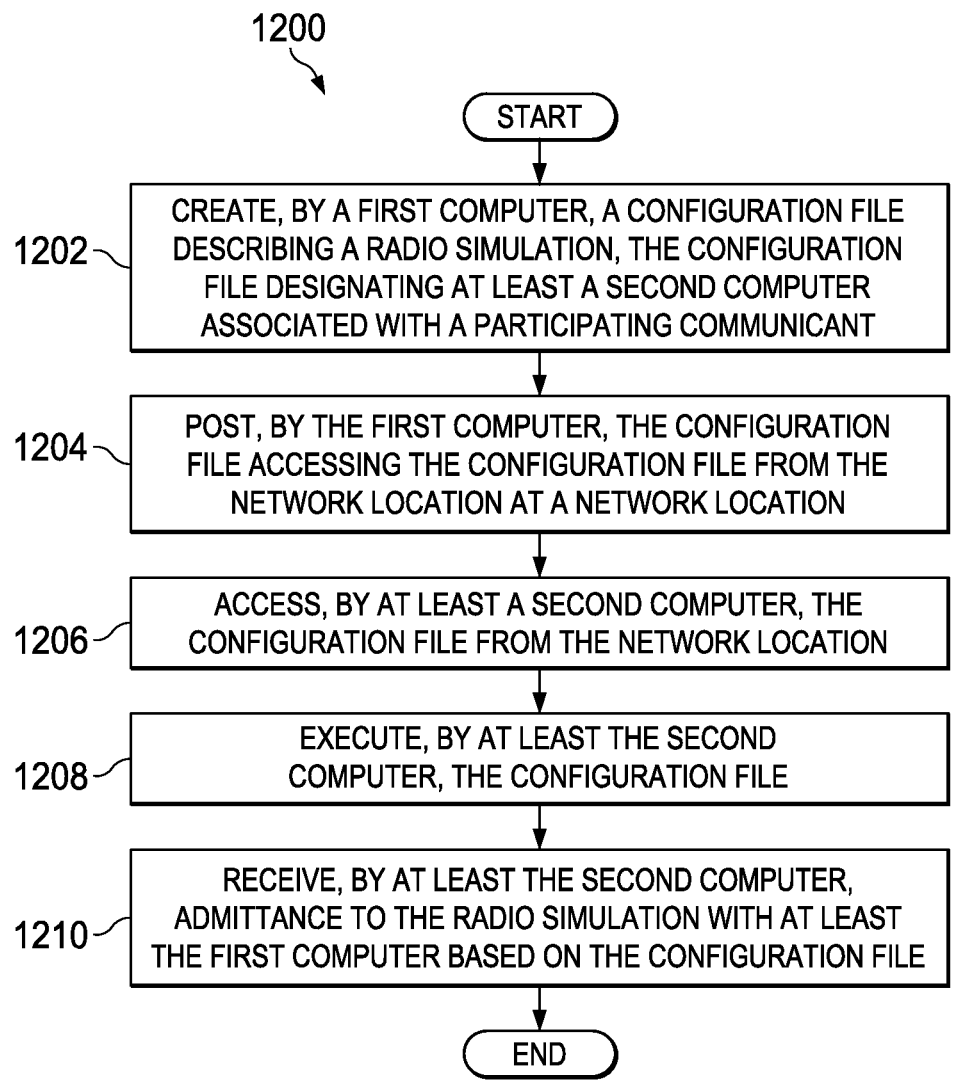
FIG. 12 is a flowchart of a method of radio network simulation in accordance with an illustrative embodiment.

FIG. 12 is a flowchart of a method of radio network simulation in accordance with an illustrative embodiment. Method 1200 shown in FIG. 12 may be implemented using system 100 of FIG. 1. The process shown in FIG. 12 may be implemented by a processor, such as processor unit 1304 of FIG. 13. The process shown in FIG. 12 may be a variation of the techniques described in FIG. 1 through FIG. 11 and FIG. 13. Although some of the operations presented in FIG. 12 are described as being performed by a "process," the operations are being performed by at least one tangible processor or using one or more physical devices, as described elsewhere herein. The term "process" also may include computer instructions stored on a non-transitory computer readable storage medium.

Method 1200 may begin as the process may create, by a first computer, a configuration file describing a radio simulation, the configuration file designating at least a second computer associated with a participating communicant (operation 1202). Next, the process may post, by the first computer, the configuration file accessing the configuration file from the network location at a network location (operation 1204). Next, the process may access, by at least a second computer, the configuration file from the network location (operation 1206). Next, the process may execute, by at least the second computer, the configuration file (operation 1208). Next, the process may receive, by at least the second computer, admittance to the radio simulation with at least the first computer based on the configuration file (operation 1210). Method 1200 may terminate thereafter.

First computer provided by method 1200 may correspond to computer hosting communicant 112 provided by system 100. Communicant 112 may function in a role of test director 110 as provided by system 100. Configuration file provided in method 1200 may correspond to configuration file 114 provided by system 100 and may be created in Extensible Markup Language (XML) format. Second computer provided by method 1200 may correspond to computer 102 provided by system 100. Second computer is associated with a testing lead. Testing lead is a function or role of at least one of communicant 104, communicant 106, and communicant 108. The radio simulation described in method 1200 may be of a warfare environment and may alternatively be of an environment other than a warfare environment. The radio simulation of method 1200 includes communications of the participating communicant 112 associated with at least a Distributed Interactive Simulation (DIS).

First computer in method 1200 may only create the configuration file and have no other role in method 1200. The second computer and the first computer in an embodiment may be associated with the role of testing lead and in an embodiment may in an embodiment be associated with a role other than testing lead.

Figure 13:
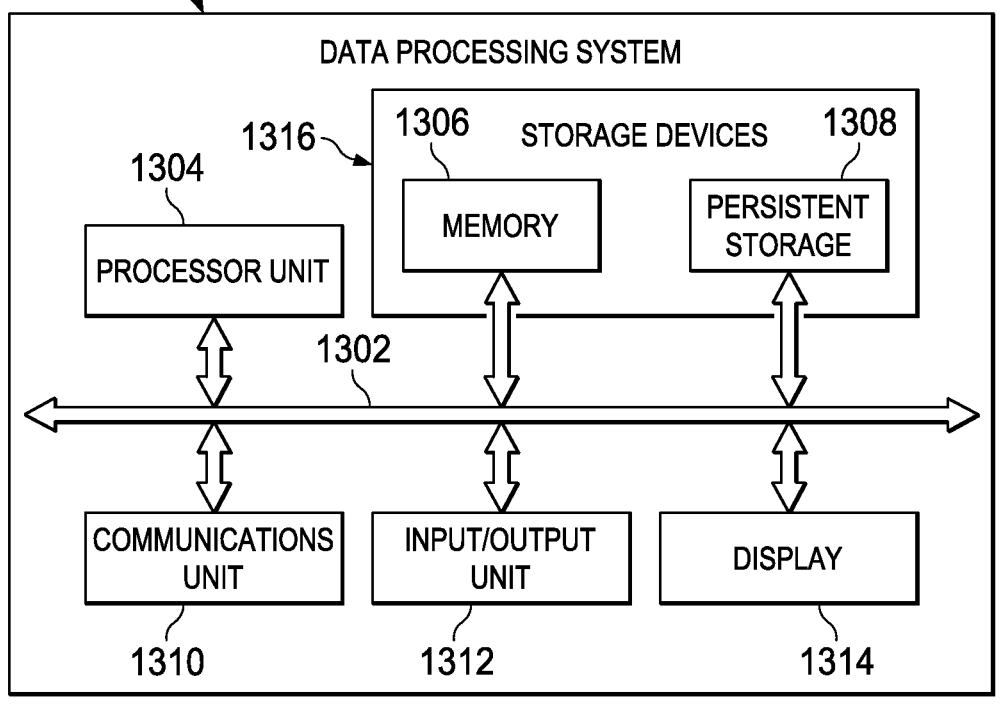
FIG. 13 is an illustration of a data processing system, in accordance with an illustrative embodiment
Figure 13:
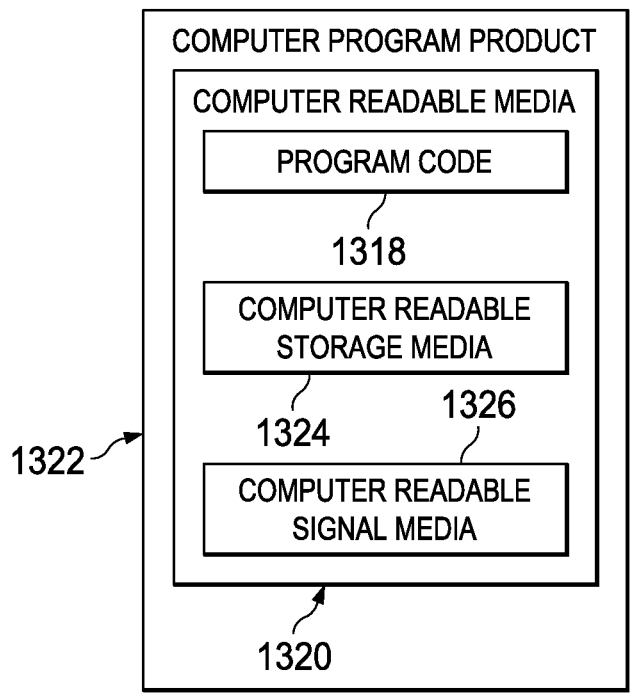

FIG. 13 is an illustration of a data processing system, in accordance with an illustrative embodiment. Data processing system 1300 in FIG. 13 is an example of a data processing system that may be used to implement the illustrative embodiments, such as system 100 of FIG. 1, or any other module or system or process disclosed herein. In an embodiment, data processing system 1300 may be an example of computer 102 provided by system 100 as well as computers hosting communicant 106, communicant 108, and communicant 112. In this illustrative example, data processing system 1300 includes communications fabric 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306 including communicant 104 and its components. Processor unit 1304 may execute steps of method 200 and method 1200. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316 that may store communicant 104 and other software components. A storage device is any piece of hardware that is capable of storing information, such as, for example, without limitation, data, program code in functional form, for example communicant 104, and/or other suitable information either on a temporary basis and/or a permanent basis. Storage devices 1316 may also be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. Communications unit 1310 may be used to distribute software, including configuration file 114. In these examples, communications unit 1310 is a network interface card. Communications unit 1310 may provide communications through the use of either or both physical and wireless communications links.

Input/output (I/O) unit 1312 allows for input and output of data with other devices that may be connected to data processing system 1300. For example, input/output (I/O) unit 1312 may provide a connection for user input through a keyboard, a mouse, and/or some other suitable input device. Further, input/output (I/O) unit 1312 may send output to a printer. Display 1314 provides a mechanism to display information to a user. Input/output (I/O) unit 1312, may, for example, be microphone 136 or speaker/headset 138 provided by system 100.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer implemented instructions, which may be located in a memory, such as memory 1306. The processes of the different embodiments may include actions associated with executing operations of at least method 200 and method 1200.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326. Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected to data processing system 1300. In some instances, computer readable storage media 1324 may not be removable from data processing system 1300.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1318 may be omitted because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

As another example, a storage device in data processing system 1300 is any hardware apparatus that may store data. Memory 1306, persistent storage 1308, and computer readable media 1320 are examples of storage devices in a tangible form.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1306, or a cache, such as found in an interface and memory controller hub that may be present in communications fabric 1302.

Data processing system 1300 may also include at least one associative memory (not shown). Associative memory may be in communication with communications fabric 1302. Associative memory may also be in communication with, or in some illustrative embodiments, be considered part of storage devices 1316.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of radio simulation, comprising:
   a first computer operated by a first user and executing a communication manager, the communication manager configured to provide a radio simulation environment comprising a virtual radio network;
   the first computer executing a communication management controller, wherein the communication management controller receives radio control input for the virtual radio network;
   the first computer executing a tactical and environment cue controller, the tactical and environment cue controller configured to provide simulated audible sounds for the radio simulation environment;
   the first computer executing a configuration controller, the configuration controller coupled to the communication manager and configured to receive at least one radio simulator configuration that designates at least a number of radios and frequencies, wherein the at least one radio simulator configuration comprises a first configuration file;
   creating the first configuration file by the first computer;
   distributing the first configuration file to a second computer operated by a second user, wherein the second user has a role in a radio simulation, wherein the second computer is initially improperly configured for use as the role, wherein the first configuration file is customized for the second user based on the role, wherein the configuration file further comprises control files that, when executed by the second computer, adapt hardware and software configurations of the second computer for use in the radio simulation as the role; and
   thereafter the second computer automatically adapting the hardware and software configurations of the second computer using the first configuration file, without the second user performing any reconfiguration operations, to properly configure the second computer for use as the role.

2. The method of claim 1, further comprising the first computer activating at least one data stream controller for at least one of audible input and output.

3. The method of claim 1, further comprising the first computer activating at least one logging controller configured to receive and store operational messages associated with the radio simulation environment and configured to communicate the operational messages in response to a request.

4. The method of claim 1, further comprising the first computer activating at least one presence controller configured to capture and communicate system configuration and performance statistics associated with the radio simulation environment.

5. The method of claim 1, wherein the first computer hosts a first communicant taking part in the radio simulation with at least a second communicant.

6. The method of claim 1, wherein the first computer uses at least a Distributed Interactive Simulation (DIS) protocol in the radio simulation environment.

7. The method of claim 1, wherein the radio control input for the first computer comprises at least one of frequencies, operation modes and transmit and receive commands for the virtual radio network.

8. The method of claim 1, wherein the at least one of the communication manager, the communication management controller of the communication manager, the configuration controller, and the tactical and environment cue controller are provided to the first computer in a configuration file created by a second computer.

9. The method of claim 1 further comprising:
   performing the radio simulation using the first configuration file.

10. The method of claim 9 further comprising:
    the second user acting in part of the radio simulation using the second computer and the first configuration file, wherein acting is selected from the group consisting of: listening, speaking, and a combination of listening and speaking.

11. A system of radio simulation, comprising:
    a processor; and
    a memory connected to the processor, the memory storing program code which, when executed by the processor, performs a computer-implemented method, the program code comprising:
    program code for performing, using the processor, executing a communication manager, the communication manager configured to provide a radio simulation environment comprising a virtual radio network; program code for performing, using the processor, executing a communication management controller, wherein the communication management controller receives radio control input for the virtual radio network;
    program code for performing, using the processor, executing a tactical and environment cue controller, the tactical and environment cue controller configured to provide simulated audible sounds for the radio simulation environment;

program code for performing, using the processor, executing a configuration controller, the configuration controller coupled to the communication manager and configured to receive at least one radio simulator configuration that designates at least a number of radios and frequencies, wherein the at least one radio simulator configuration comprises a first configuration file;

program code for creating the first configuration the by the first computer;

program code for distributing the first configuration the to a second computer operated by a second user, wherein the second user has a role in a radio simulation, wherein the second computer is initially improperly configured for use as the role, wherein the first configuration the is customized for the second user based on the role, wherein the configuration file further comprises control files that, when executed by the second computer, adapt hardware and software configurations of the second computer for use in the radio simulation as the roll; and program code for, thereafter, the second computer automatically adapting the hardware and software configurations of the second computer using the first configuration file, without the second user performing any reconfiguration operations, to properly configure the second computer for use as the role.

12. The system of claim 11, wherein at least one data stream controller is activated for at least one of audible input and output.

13. The system of claim 11, wherein at least one log controller is activated, the at least one log controller configured to receive and store operational messages associated with the radio simulation environment and configured to communicate the operational messages in response to a request.

14. The system claim 11, wherein at least one presence controller is activated, the at least one presence controller configured to capture and communicate system configuration and performance statistics associated with the radio simulation environment.

15. The system of claim 11, wherein the system is associated with a first communicant taking part in the radio simulation with at least a second communicant.

16. The system of claim 11, wherein the system uses as least a Distributed Interactive Simulation (DIS) protocol in the radio simulation environment.

17. The system of claim 11, wherein the at least one radio simulator configuration comprises a first configuration file, and wherein in being configured to receive the at least one radio simulation configuration, the program code further comprises:

program code for downloading the first configuration file by executing a desktop object.

18. A method of radio simulation, comprising:

a first computer operated by a first user and executing a communication manager, the communication manager configured to provide a radio simulation environment comprising a virtual radio network;

the first computer executing a communication management controller, wherein the communication management controller receives radio control input for the virtual radio network;

the first computer executing a tactical and environment cue controller, the tactical and environment cue controller configured to provide simulated audible sounds for the radio simulation environment;

the first computer executing a configuration controller, the configuration controller coupled to the communication manager and configured to receive at least one radio simulator configuration that designates at least a number of radios and frequencies, wherein the at least one radio simulator configuration comprises a first configuration file;

creating, by the first computer operated by the first user having the first role, the configuration file, wherein the configuration file describes the radio simulation, the configuration file designating at least a second computer associated with a participating communicant;

posting, by the first computer, the configuration file at a network location;

accessing, by at least the second computer operated by a second user having a second role, the configuration file from the network location, wherein the second computer is initially improperly configured for use as the second role, wherein the configuration file is customized for the second user based on the role, wherein the configuration file further comprises control files that, when executed by at least the second computer, adapt hardware and software configurations of at least the second computer for use in the radio simulation as the second role; executing, by at least the second computer, the configuration file;

thereafter the at least second computer automatically adapting the hardware and software configurations of the second computer using the configuration file, without the second user performing any reconfiguration operations, to properly configure at least the second computer for use as the role; and receiving, by at least the second computer, admittance to the radio simulation with at least the first computer based on the configuration file.

19. The method of claim 18, wherein the configuration file comprises at least one of a communication manager, a communication management controller, a configuration controller, and a tactical and environment cue controller.

20. The method of claim 18, wherein the configuration file is in Extensible Markup Language (XML) format.

21. wherein at least the second computer is associated with a testing lead.

22. The method of claim 18, wherein the radio simulation is of a warfare environment.

23. The method of claim 18, wherein the radio simulation includes communications of the participating communicant associated with at least a Distributed Interactive Simulation (DIS).

* * * * *

UNITED STATES PATENT AND TRADEMARK OFFICE
CERTIFICATE OF CORRECTION

PATENT NO.       : 9,640,086 B2
APPLICATION NO.  : 14/251569
DATED            : May 2, 2017
INVENTOR(S)      : Van Leer et al.

Page 1 of 1

It is certified that error appears in the above-identified patent and that said Letters Patent is hereby corrected as shown below:

In the Claims

Column 21, Line 3, change "environment;" to -- environment; and --
    Line 11, change "configuration the" to -- configuration file --
    Line 13, change "configuration the" to -- configuration file --
    Line 17, change "configuration the" to -- configuration file --
    Line 22, change "roll" to -- role --

Column 22, Line 51, change "21. wherein" to -- 21. The method of claim 18, wherein --

Signed and Sealed this
Sixth Day of March, 2018

Andrei Iancu
*Director of the United States Patent and Trademark Office*